March 6, 1951  A. E. KERN ET AL  2,544,026
ANIMAL TRAP
Filed Sept. 18, 1948  3 Sheets-Sheet 2

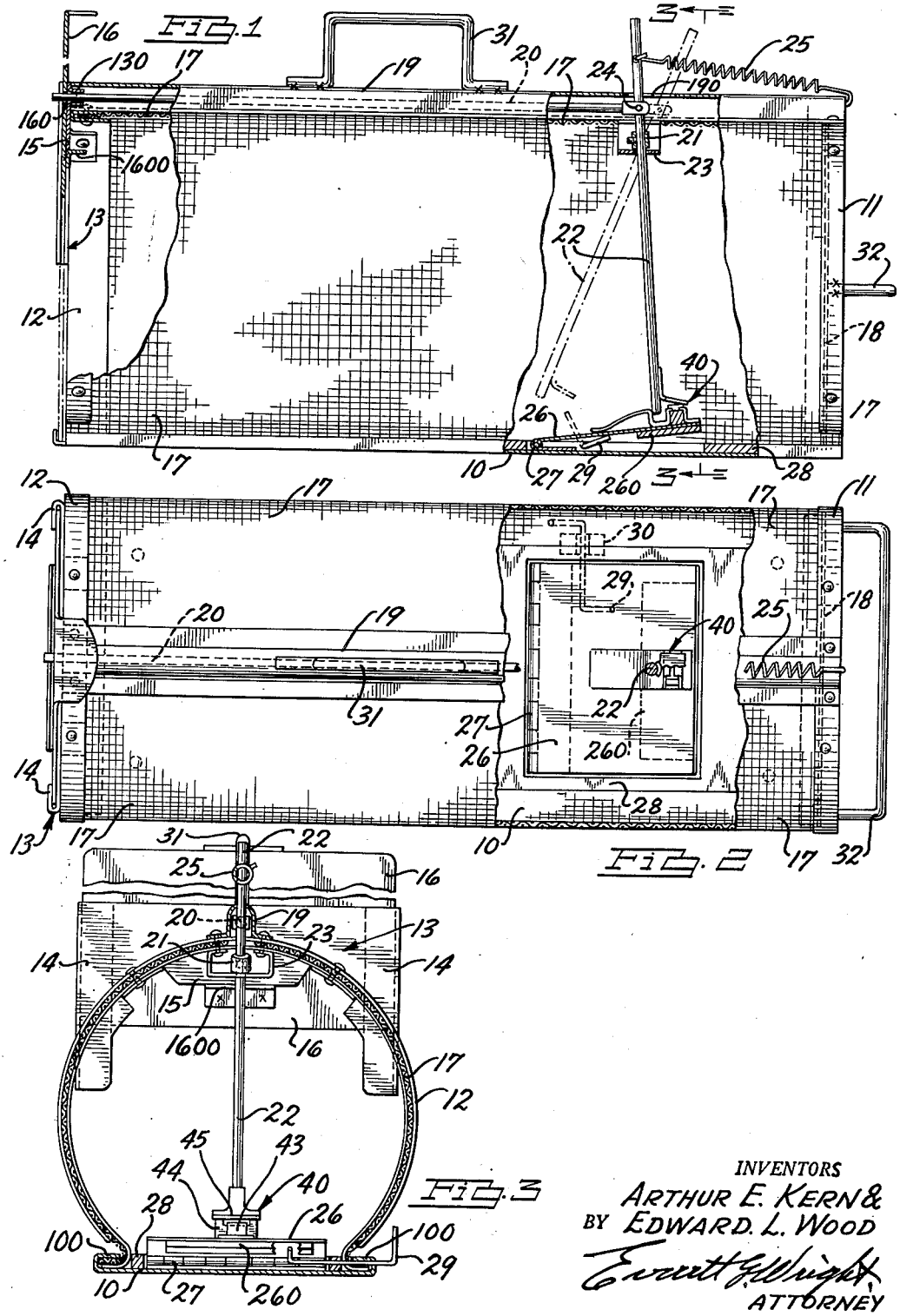

INVENTORS
ARTHUR E. KERN &
BY EDWARD L. WOOD
ATTORNEY

March 6, 1951 — A. E. KERN ET AL — 2,544,026
ANIMAL TRAP
Filed Sept. 18, 1948 — 3 Sheets-Sheet 3
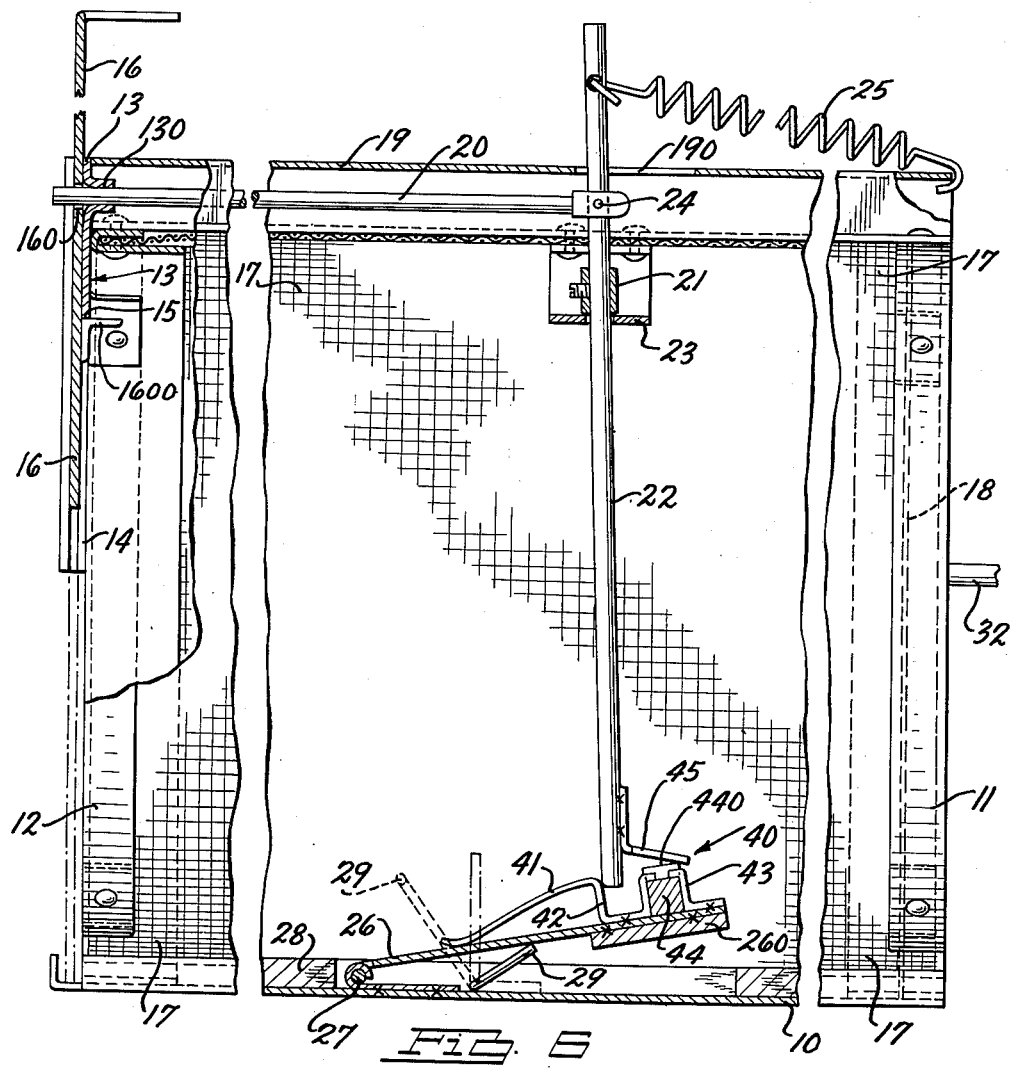
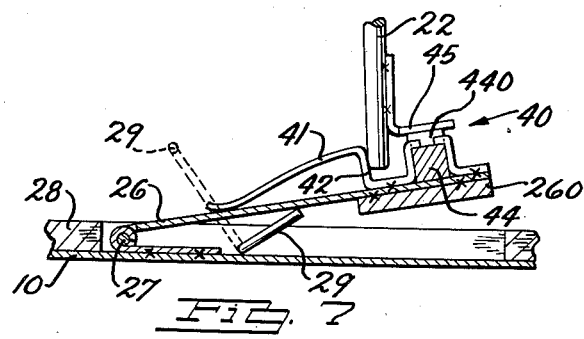
INVENTOR.
ARTHUR E. KERN &
BY EDWARD L. WOOD
ATTORNEY Patented Mar. 6, 1951

2,544,026

UNITED STATES PATENT OFFICE 2,544,026

ANIMAL TRAP

Arthur E. Kern and Edward L. Wood,
Detroit, Mich.

Application September 18, 1948, Serial No. 49,942

3 Claims. (Cl. 43—61)

This invention relates to improvements in animal traps and in particular to traps adapted to catch rodents such as rats, mice, field mice, rabbits and squirrels, and birds and the like without killing them.

One of the most important elements of an animal trap is the sensitivity of its trip or trigger mechanism. Certain animals crawl over and jump onto traps which requires the use of less sensitive trip or trigger mechanism because, with extremely sensitive trip or trigger mechanism, a trap may be sprung merely by the animal to be caught rubbing against or crawling over the trap.

Another important characteristic of animal traps that is extremely desirable is ease and accuracy of setting to a desired sensitivity.

Furthermore, complicated and cumbersome trip or trigger mechanism ofttimes arouses the suspicion of animals to be trapped thereby reducing the effectiveness of the trap.

With the foregoing in view, the primary object of the invention is to provide an improved animal trap that may be easily and readily set at all times, which may have its trip or trigger mechanism adjusted prior to the time of setting the trap to the desired degree of sensitivity, and which may be set repeatedly to the adjusted degree of sensitivity with facility and with assuredness that the said desired degree of sensitivity to which the trip or trigger mechanism of the trap is adjusted will be attained and maintained at each setting of the trap.

Another object of the invention is to provide an improved animal trap having magnetic means for readily setting the trap and maintaining the trap set, the magnetic trip or trigger mechanism of the said trap being subject to ready adjustment to the desired degree of sensitivity, and, once the said magnetic trip or trigger mechanism is set to the desired degree of sensitivity, subsequent settings of the trap will each be of the same degree of sensitivity.

Other objects of the invention will become apparent by reference to the following detailed description taken in connection with the accompanying drawings, in which:

Fig. 1 is a side elevational view of an animal trap embodying the invention, the trap being set and portions thereof being broken away to illustrate the construction more clearly.

Fig. 2 is a top plan view with portions thereof broken away.

Fig. 3 is a transverse sectional view taken on the line 3—3 of Fig. 1.

Fig. 6 is an enlarged longitudinal sectional view showing the trap in its set position, the trip or trigger mechanism being shown in its most sensitive adjustment.

Fig. 7 is an enlarged fragmentary sectional view similar to Fig. 6 showing the trap in its set position, the trip or trigger mechanism being shown in its least sensitive adjustment.

Figure 4:
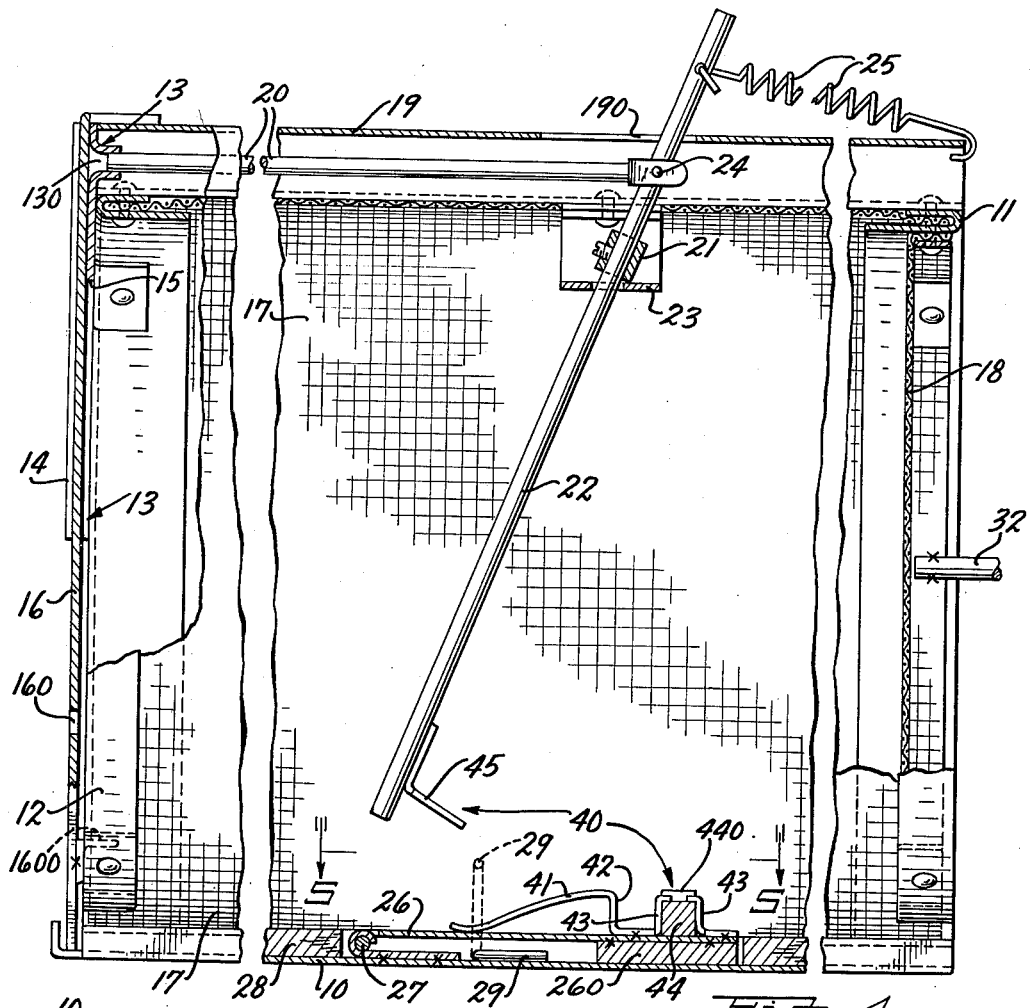
Fig. 4 is an enlarged longitudinal sectional view showing the trap in its sprung position.

Referring now to the drawing wherein like numerals refer to like and corresponding parts throughout the several views, the particular animal trap shown for the purpose of illustrating the invention comprises a base 10, a truncated circular rear end frame 11 and a truncated circular front end frame 12 each secured to the base 10, a door guide and front end assembly 13 including laterally spaced vertically disposed door channels 14 and a door stop 15 secured to the front end frame 12, a gravity sliding door 16 disposed in the said door channels 14, an enclosure 17 of reticulated material extending from each side of the base 10 around the end frames 11 and 12 anchored to the said base 10 at each flanged side 100 thereof and to the end frames 11 and 12, an end enclosure 18 of reticulated material anchored to the rear end frame 12, a hollow ridge 19 spanning between and fixed to the top of the end frames 11 and 12 over the enclosure 17, a latch rod 20 reciprocatingly disposed in the said hollow ridge 19, the said front end assembly 13 and the sliding door 16 having suitable apertures 130 and 160 respectively therein through which the latch rod 20 extends to hold the gravity sliding door 16 up or open when the trap is set, a stop 1600 on the sliding door 16 cooperating with the door stop 15 on the front end frame 12 aligning the said apertures 130 and 160 when the gravity sliding door is lifted up when setting the trap, a trigger rod 22 disposed through and hingedly suspended from the said hollow ridge 19 on a suitably apertured bracket 23, said trigger rod 22 extending upwardly through a suitable slot 190 provided in the said hollow ridge 19, an annular sleeve 21 secured on the said trigger rod 22 serving to support the said trigger rod 22 at the desired height in the said bracket 23, a pivot 24 pivotally connecting the said latch rod 20 to the said trigger rod 22, a tension spring 25 connected to the trigger rod 22 above the said pivot 24 and anchored to the hollow ridge 19 rearwardly of the said bracket 23 constantly urging the upper portion of the said trigger rod 22 to pivot rearwardly and move the latch rod 20 out of engagement with the gravity sliding door 16 and at the same time constantly urging the lower end of the said trigger rod 22 to pivot forwardly, a tread plate 26 including a hinge 27 hingedly supporting the said tread plate 26 on the base 10 under the said trigger rod 22, a floor 28 of wood, plywood or other suitable material secured onto the said base 10 covering the said base 10 within the trap except at the tread plate 26, the said plate 26 including a counterweight 260 secured to the bottom of the free end thereof supporting the said thread plate 26 substantially level with the floor 28, a lever mechanism 29 preferably formed of stiff wire hinged to the base 10 by a clip 30 engaging the bottom of the tread plate 26 with a lever action for manually lifting the said tread plate 26 when setting the trap, and magnetic trigger mechanism generally designated by the numeral 40 hereinafter described in detail, the said trap having carrying handles 31 and 32 secured to the top of the ridge 19 and across the rear end frame respectively for convenience in carrying the trap and emptying animals caught into a pail, tub or barrel of water to drown or otherwise destroy them.

Figure 5:
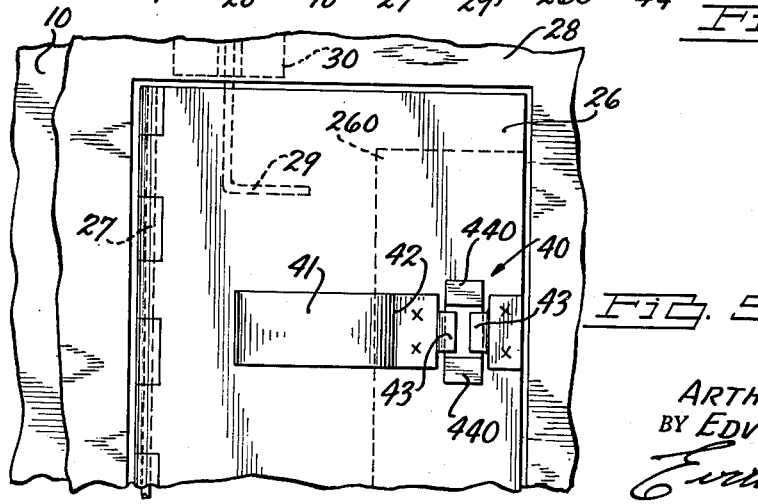
Fig. 5 is an enlarged fragmentary plan view taken on the line 5—5 of Fig. 4.

The magnetic trigger mechanism 40 shown in detail in Figs. 4, 5, 6 and 7 comprises a narrow longitudinally disposed trigger stop 41 welded or otherwise secured to the top of the tread plate 26 at the center of the rear thereof and is formed to provide a generally vertical wall 42 against which the lower end of the trigger rod 22 rests when the trap is set. The rear of the said stop 41 is also formed to provide tabs 42 which engage and hold in place a permanent magnet 44 having surfaces 440 extending above the said tabs 43. The rear of the said trigger rod 22 is provided with a rearwardly disposed metal lug or shelf 45 which is positioned over the magnet 44 when the trap is set. The said lug or shelf 45 is preferably formed of an angular piece of manually bendable steel with the upstanding leg of the angle welded to the back of the said trigger rod 22, the outstanding leg of the said angular piece of metal forming the said lug or shelf 45 is preferably formed of an angular piece of manually bendable steel with the upstanding leg of the angle welded to the back of the said trigger rod 22, the outstanding leg of the said angular piece of metal forming the said lug or shelf 45 being coextensive of the magnet 44.

When the lug or shelf 45 is bent to an obtuse angle with respect to the upstanding leg thereof fixed to the trigger rod 22 and the trap is set as shown in Fig. 6, the minimum magnetic effect is employed to hold the trigger mechanism 40 in its set position and a minimum area of contact is employed between the trigger rod 22 and vertical wall 42 of the trigger stop 41. This provides a very fine or sensitive setting of the trap, and the trigger mechanism 40 functions and the trap is sprung responsive to the slightest touch or weight applied by an animal to the tread plate 26.

When the lug or shelf 45 is bent to an acute angle with respect to the upstanding leg thereof fixed to the trigger rod 22 and the trap is set as shown in Fig. 7, the maximum magnetic effect is employed to hold the trigger mechanism 40 in its set position and a maximum area of contact is employed between the trigger rod 22 and the vertical wall 42 of the trigger stop 41. This provides a very heavy or less sensitive setting of the trap and the trigger mechanism functions and the trap is sprung responsive to a relatively heavier touch or weight applied by an animal to the tread plate 26.

When the trap is set as shown in Fig. 6, the trigger mechanism will function at the slightest jarring of the trap, and such a setting is employed when the trap is used to catch smaller and lighter types of animals. When the trap is set as shown in Fig. 7, the trigger mechanism will not function as a result of a slight jarring of the trap, and such a setting is employed when the trap is used to catch heavier types of animals. By bending the shelf 45 to positions between those shown in Fig. 6 and in Fig. 7, any desired degree of sensitivity of the trigger mechanism 40 may be obtained.

Once the lug or shelf 45 is bent to cause the trap to function at the desired degree of sensitivity, the trap may be set repeatedly to that degree of sensitivity by merely lifting the gravity sliding door 16 to its maximum upward movement as permitted by the stops 15 and 1600, moving the top of the trigger rod 22 forward which causes the latch rod 20 to extend through the aperture 160 in the gravity sliding door 16, manipulating the lever 29 to lift the tread plate 26 until the permanent magnet 44 of the magnetic trigger mechanism 40 fixed to the tread plate 26 attracts and holds the tread plate to the shelf 45 on the trigger rod 22, and then gradually permitting the top of the trigger rod 22 to move rearwardly under its spring load until the front of the lower end of the trigger rod 22 is positioned in abutting relationship against generally vertical wall 42 of the stop 41 of the magnetic trigger mechanism 40. Thus, immediate, positive and accurate setting of the trap to the desired degree of sensitivity may be accomplished repeatedly, with little effort, and with positive assurance that the trap will be properly set each and every time the trap is used.

Although but a single embodiment of the invention has been disclosed and described, many changes may be made in size, shape, arrangement and detail of the several elements of the invention without departing from the spirit and scope thereof as defined by the appended claims.

We claim:

1. In an animal trap of the type including a gravity sliding door, a hinged tread plate and a spring loaded trigger mechanism holding the said hinged tread plate up and the gravity sliding door open when the trap is set releasable responsive to an animal walking onto the said tread plate, the said trigger mechanism comprising a latch rod releasably engaging the said gravity sliding door and holding it open when the trap is set, a trigger rod pivotally suspended within the said trap to which the said latch rod is pivoted, spring means engaging the said trigger rod constantly urging the said trigger rod to pivot and release the said latch rod from engagement with the said gravity sliding door whereby to spring the trap, and magnetic means coupling the trigger rod to the tread plate when the trap is set releasable responsive to the weight of an animal on the said tread plate.

2. In an animal trap of the type including a gravity sliding door, a hinged tread plate and a spring loaded trigger mechanism holding the said hinged tread plate up and the gravity sliding door open when the trap is set releasable responsive to an animal walking onto the said tread plate, the said trigger mechanism comprising a latch rod releasably engaging the said gravity sliding door and holding it open when the trap is set, a trigger rod pivotally suspended within the said trap to which the said latch rod is pivoted, spring means engaging the said trigger rod constantly urging the said trigger rod to pivot and release the said latch rod from engagement with the said gravity sliding door whereby to spring the trap, a permanent magnet fixed to the said tread plate, and a lug on the said trigger rod to which the said magnet is attracted, the said tread plate being held up by the said magnet and releasable responsive to the weight of an animal on the said tread plate whereby to spring the trap.

3. In an animal trap of the type including a gravity sliding door, a hinged tread plate and a spring loaded trigger mechanism holding the said hinged tread plate up and the gravity sliding door open when the trap is set releasable responsive to an animal walking onto the said tread plate, the said trigger mechanism comprising a latch rod releasably engaging the said gravity sliding door and holding it open when the trap is set, a trigger rod pivotally suspended within the said trap to which the said latch rod is pivoted, spring means engaging the said trigger rod constantly urging the said trigger rod to pivot and release the said latch rod from engagement with the said gravity sliding door whereby to spring the trap, a generally vertical stop including a permanent magnet spaced therefrom fixed on the said tread plate at the movable end thereof, and a lug on the said trigger rod to which the said magnet is attracted, the said tread plate being held up by the said magnet simultaneously with the trigger rod contacting the said vertical stop when the trap is set, the said trigger rod being releasable from both the vertical stop and the magnet responsive to the weight of an animal on the said tread plate whereby to spring the trap.

ARTHUR E. KERN.
EDWARD L. WOOD.

REFERENCES CITED

The following references are of record in the file of this patent:

UNITED STATES PATENTS

| Number | Name | Date |
|---|---|---|
| 181,446 | Jenne | Aug. 22, 1876 |
| 1,011,207 | Kemp | Dec. 12, 1911 |
| 1,372,663 | Albers | Mar. 29, 1921 |
| 2,268,468 | Adams | Dec. 30, 1941 |